UNITED STATES PATENT OFFICE.

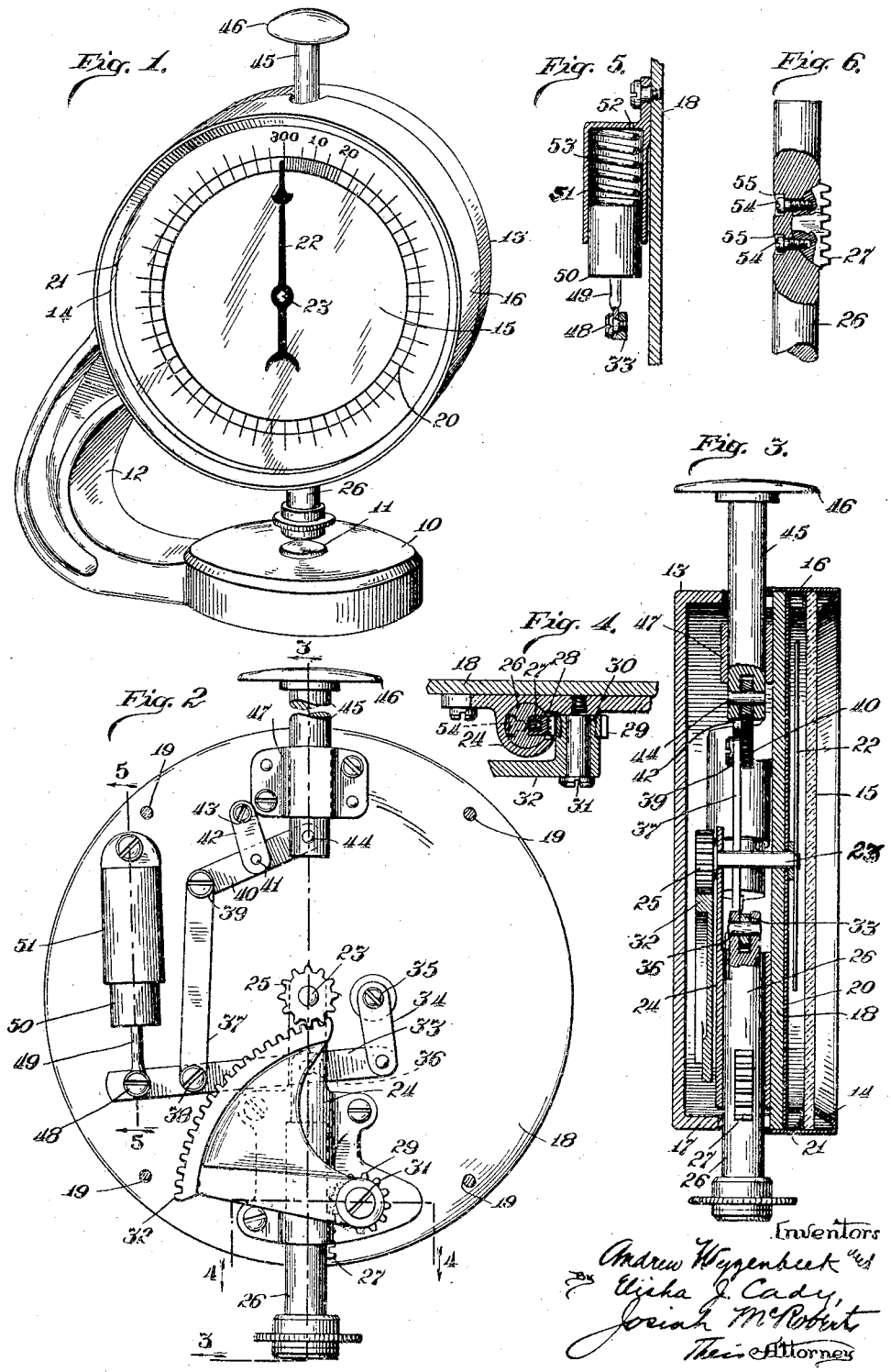

ANDREW WYZENBEEK, OF CHICAGO, AND ELISHA JESSE CADY, OF OAK PARK, ILLINOIS; SAID WYZENBEEK ASSIGNOR TO SAID CADY.

MICROMETER-CALIPER.

1,354,010.   Specification of Letters Patent.   Patented Sept. 28, 1920.

Application filed May 24, 1919. Serial No. 299,479.

*To all whom it may concern:*

Be it known that we, ANDREW WYZENBEEK and ELISHA JESSE CADY, citizens of the United States, residing, respectively, at Chicago and Oak Park, in the county of Cook and State of Illinois, have invented certain new and useful Improvements in Micrometer-Calipers, of which the following is a specification, reference being had therein to the accompanying drawing.

The invention relates to micrometer calipers for measuring the thicknesses of various materials, and especially to such instruments for measuring the thicknesses of different grades or "points" of paper-stock in which the material is graded in variations of one-thousandth part of an inch.

The invention consists in the matters hereinafter described and then pointed out in the appended claims, and its features are illustrated in the accompanying drawing in which, Figure 1 is a view in front elevation of the device partly in perspective showing the general arrangement of the parts;

Fig. 2 is a view in rear elevation of the back of the supporting plate with its associated elements;

Fig. 3 is a vertical sectional view on the line 3—3 of Fig. 2 and also through the casing, with parts broken away;

Fig. 4 is a detail sectional view on the line 4—4 of Fig. 2;

Fig. 5 is a detail vertical sectional view on the line 5—5 of Fig. 2, and

Fig. 6 is a detail sectional view of the plunger.

In the drawings the reference numeral 10 represents the usual base having a central flat anvil 11 and supporting a curved bracket-arm 12 which carries at its upper free end the usual circular casing 13 spaced a suitable distance above the base and carrying a removable front closing-cap 14 comprising a glass face 15 and a rear flange 16 fastened to the front flange 17 of the casing to provide a central chamber. A circular supporting-plate 18 is secured by lag screws at 19 to the flange 17, and the usual circular dial 20 having an indicating scale on which the gradations or divisions are marked in units of one-thousandth parts of an inch from zero to .300 is clamped between the front face of the plate 18 and a spacing band or bead 21 in the cap 14 to leave a space between the glass-front of the cap and the plate 18 for the revoluble pointer 22 which is mounted on the front squared end of a revoluble spindle 23 projecting through an opening at the center of the scale and mounted to freely rotate in bearings in the plate 18 and in the upper end of the bracket 24 secured on the rear face of the plate. The spindle 23 carries a fixed pinion 25 on its rear end projecting through the bracket 24, and it is secured to one end of the usual coil-spring (not shown) whose other end is secured to the plate 18, so that when the spindle is rotated to move the pointer away from its normal zero position the spring is put under tension. A plunger 26 is mounted to reciprocate in line with the anvil 11 in suitable bearings between the rear face of the plate 18 and the curved body of the bracket 24, its lower end passing freely through an opening in the lower portion of the flanges 16 and 17 to register with the anvil.

The plunger carries a rack-bar 27 which projects laterally through a slot 28 in one side of the body of the bracket 24, and is engaged by a pinion 29 fixed to a sleeve 30 revolubly mounted on a stub-shaft 31 fixed to the bracket 24 adjacent the slot 28. The sleeve 30 is provided with an upwardly-extending segmental-gear 32 which meshes with the pinion 25 on the pointer-spindle 23, so that the pointer is moved away from its normal zero position on the scale when the plunger is raised. The upper portion of the bracket 24 is cut-away on its inner face to afford clearance for the movement of the plunger-operating lever 33 which is pivotally connected at one end to a swinging arm 34 pivoted at 35 on the plate 18. The upper end of the plunger is slotted to receive the lever 33, and these parts are pivotally coupled together by the pin 36 so that as the arm is raised the plunger is drawn away from its anvil. A link 37 is pivoted at its lower end as at 38 to the free end of the lever 33 and at its upper end as at 39 to the lower end of an operating lever 40 which is pivotally connected at its center at 41 to the lower end of a swinging arm 42 which is pivoted at its upper end at 43 to the plate 18. The upper end of the lever 40 is pivotally coupled at 44 to the lower end of the shank 45 of an operating handle 46 which reciprocates in a keeper 47 secured on the plate 18.

The plunger-operating lever 33 is pivotally coupled at 48 to the lower end of a piston-arm 49 which carries at its upper end a piston 50 which works in the lower open end of a pneumatic cylinder 51 fixed on the plate and having a vent-hole 52 in its upper closed end. A coiled return-spring 53 is housed in the cylinder, expanding between the piston and closed end of the cylinder and adapted to be put under tension by the upward movement of the piston. When the plunger 26 is moved away from its anvil by depressing the handle 46 the lever 33 raises the piston in its cylinder to put the spring under tension and expel the air which passes out through the vent-hole, and when the pressure on the handle is released the spring expands to move the piston out and the plunger down on the stock or material then in position on the anvil, and as the piston moves downward the vacuum in its cylinder is so slowly filled by the retardation of the passage of air into it through its vent-hole that the impact of the plunger is effectually cushioned.

By connecting the return spring to the plunger by the operating lever 33 its entire retractive force is applied directly to the plunger without any loss of motion or backlash, so that the plunger will not be held up by any buckling or waving in the stock or material to be calipered and thereby register by the pointer on the dial a higher or greater thickness than the stock actually has. By the pneumatic cushioning of the downstroke of the plunger the tendency of the pointer to be violently jerked back and so overrun its true position and wear the parts is obviated. The plunger and its operating handle are separate pieces connected by yielding intermediate devices, so the liability of any warping of the plate producing distortion of the plunger is obviated. All the parts that govern the accuracy of registration are mounted on the brass bracket 24, so that all trouble from warping of the plate is also eliminated. The rack-bar 27 is adjustably mounted on the plunger by two screws 54 so that it may be adjusted to different angular positions on the plunger to compensate for any error in the gears and insure accuracy in the registrations; the heads of the screws rest on shoulders 55, and their bodies extend freely through enlarged openings in the plunger so as to allow slight play of either screw when the bar is adjusted by the other. As a standard gear, for example a gear having 32 teeth to each inch of its diameter, will not equally divide the 300 scale gradations employed but gives a variation in the pointer movement for each tooth, by adjusting the rack the ratio of the gears 27 and 29 can be retarded or accelerated by causing their involute teeth to mesh for a lesser or greater depth, respectively, as the case may be, and so compensate for this variation and insure accurate registration of the pointer on the scale. In practice we have found that by this angular adjustment of the rack-bar on the plunger any small errors in the gear, though amounting to only a fraction of a point on the scale, can be compensated for and corrected, and as the teeth of the gear are involute being thicker at their roots they work smoothly with each other in all adjustments between the gear members.

When the handle is depressed the plunger is raised from the anvil and the pointer is correspondingly revolved on its dial. The stock or material to be calipered is then positioned on the anvil beneath the plunger, and when the pressure on the handle is released the return-spring moves the plunger down upon the stock with sufficient force to overcome any unevenness or buckling in it and hold it flat on the anvil, so that the pointer will move to its corresponding position on the scale, and the pneumatic check will prevent any fluttering or jerking of the pointer away from its correct registration mark.

We claim:—

1. In a calipering device, an anvil, a reciprocating handle, a reciprocating plunger, operating connections between the plunger and handle, a rack-bar on the plunger, means to adjust the bar to different angular positions on the plunger, a scale and revoluble pointer, a shaft carrying the pointer, gear connections between the shaft and rack-bar, and a return-spring for the plunger.

2. In a calipering device, an anvil, a reciprocating handle, a reciprocating plunger having an adjustable rack-bar, a gear-segment carrying a pinion engaging the rack-bar, a lever to raise the plunger, a link to operate the lever, a second lever connecting the link and handle, a scale and revoluble pointer, a shaft carrying the pointer and a fixed pinion in mesh with the gear-segment, and a return spring for the plunger-operating lever.

3. In a calipering device, an anvil, a reciprocating handle, a reciprocating plunger, a gear-segment, gear connections between the segment and plunger, a scale and revoluble pointer, a shaft carrying the pointer and a fixed pinion in mesh with the gear-segment, connections between the handle and plunger, a return spring for the plunger, a housing for the spring, and a piston in the housing connected to the plunger to put the spring under tension and to cushion the return-stroke of the plunger.

4. In a calipering device, an anvil, a reciprocating handle, a reciprocating plunger, a gear-segment, gear connections between the segment and plunger, a scale and revoluble pointer, a shaft carrying the pointer and a fixed pinion in mesh with the gear-segment, a lever to raise the plunger, connections between the lever and handle, a piston operated by the lever, a pneumatic cylinder to cushion the pinion on the return-stroke of the plunger, and a return-spring in the cylinder and put under tension by the piston when the plunger is raised.

In testimony whereof we affix our signatures in presence of two witnesses.

ANDREW WYZENBEEK.
    ELISHA JESSE CADY.

Witnesses:
 J. McRoberts,
 Edith M. Jacobs.